United States Patent
Aissi et al.

(10) Patent No.: US 9,633,098 B2
(45) Date of Patent: Apr. 25, 2017

(54) SYSTEM AND METHOD FOR MAINTAINING DEVICE STATE COHERENCY

(71) Applicant: Visa International Service Association, San Francisco, CA (US)

(72) Inventors: Selim Aissi, Menlo Park, CA (US); Taeho Kgil, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 167 days.

(21) Appl. No.: 14/036,938

(22) Filed: Sep. 25, 2013

(65) Prior Publication Data

US 2014/0089261 A1 Mar. 27, 2014

Related U.S. Application Data (60) Provisional application No. 61/705,443, filed on Sep. 25, 2012.

(51) Int. Cl.
*G06F 17/30* (2006.01)
(52) U.S. Cl.
CPC .............................. *G06F 17/30575* (2013.01)
(58) Field of Classification Search
CPC ......... G06F 17/30575; G06F 17/30578; G06F 17/30581
See application file for complete search history.

(56) References Cited

U.S. PATENT DOCUMENTS

| | | | |
|---|---|---|---|
| 5,434,994 A | 7/1995 | Shaheen et al. | |
| 6,625,623 B1* | 9/2003 | Midgley | G06F 11/1451 707/640 |
| 6,810,405 B1* | 10/2004 | LaRue | A61M 19/00 707/613 |
| 7,527,558 B2 | 5/2009 | Lavoie et al. | |
| 7,930,269 B2 | 4/2011 | Hindle et al. | |
| 8,380,951 B1* | 2/2013 | Krinke et al. | 711/162 |
| 8,768,845 B1* | 7/2014 | Persson | G06F 21/57 235/379 |
| 2004/0039919 A1* | 2/2004 | Takayama | G06Q 20/04 713/180 |
| 2005/0187971 A1* | 8/2005 | Hassan | G06F 17/30424 |

(Continued)

OTHER PUBLICATIONS http://www.apple.com/pr/library/2011/06/06/Apple-Introduces-iCloud.html, printed Apr. 3, 2014, 2 pages.

(Continued)

*Primary Examiner* — Cam-Y Truong
(74) *Attorney, Agent, or Firm* — Kilpatrick Townsend & Stockton LLP (57) ABSTRACT

Embodiments of the invention are directed to systems and methods for maintaining coherency between different entities in a distributed system. A coherency module automatically detects a change in state in a first entity, wherein the change in state relates to a change in functional code in the first entity. A synchronization message is transmitted to a second entity to synchronize data in the second entity with data in the first entity as a result of the change in state. The second entity is configured to synchronize the data in the second entity with the data in the first entity after receiving the synchronization message.

19 Claims, 7 Drawing Sheets

(56) References Cited

U.S. PATENT DOCUMENTS

| | | | |
|---|---|---|---|
| 2005/0205664 A1* | 9/2005 | Kromann | G06Q 10/107 235/380 |
| 2006/0047718 A1 | 3/2006 | Keith et al. | |
| 2006/0161741 A1 | 7/2006 | Yasue et al. | |
| 2009/0157802 A1* | 6/2009 | Kang et al. | 709/203 |
| 2010/0161741 A1* | 6/2010 | Jiang et al. | 709/206 |
| 2010/0205105 A1* | 8/2010 | Robertson et al. | 705/334 |
| 2011/0153586 A1* | 6/2011 | Wang et al. | 707/706 |
| 2011/0161290 A1 | 6/2011 | Waterman et al. | |
| 2012/0158584 A1* | 6/2012 | Behren | G06Q 20/10 705/41 |
| 2012/0171992 A1* | 7/2012 | Cheong | H04L 63/067 455/410 |
| 2013/0005354 A1* | 1/2013 | Sheilendra | H04W 4/028 455/456.1 |
| 2013/0152185 A1* | 6/2013 | Singh | G06F 21/35 726/9 |
| 2014/0006221 A1* | 1/2014 | Thiele et al. | 705/28 |

OTHER PUBLICATIONS http://www.technobuffalo.com/2011/03/03/10-tips-and-tricks-for-dropbox/, printed Apr. 3, 2014, 12 pages.

\* cited by examiner

SYSTEM AND METHOD FOR MAINTAINING DEVICE STATE COHERENCY

CROSS-REFERENCES TO RELATED APPLICATIONS

This application is a non-provisional application and claims the benefit of priority of U.S. Provisional Application No. 61/705,443 titled "Maintain Device State Coherency," and filed on Sep. 25, 2012, which is herein incorporated by reference in its entirety for all purposes.

BACKGROUND

More and more users are relying on electronic devices, in particular, mobile devices, for day to day tasks such as banking, shopping, social networking, entertainment, etc. Mobile devices may communicate with a plurality of entities, e.g., mobile network operators, merchant servers, e-commerce sites, financial institutions, and such, in a distributed system to seamlessly execute these tasks.

Generally, each entity in a distributed system has its own memory to store data and/or code associated with certain applications pertaining to a user. Thus, for a payment application, security and privacy sensitive information may be stored in more than one entity, such as the mobile device, cloud and/or different servers in a distributed system.

However, in a distributed system, different entities may share a common state that may or may not share the same data. For example, in a distributed system comprising a plurality of entities, multiple instances of an application may exist on more than one entity. Thus, code and/or data may be shared between two or more entities. For example, a wallet application on a mobile device may share code and/or data between the mobile device, a wallet provider, and a back-end server associated with an issuer/payment processing network. Further, the mobile device may have code and/or data associated with the wallet application shared between different entities on the mobile device itself. For example, account related data (e.g., account numbers, expiration dates, user personal information, etc.) and cryptographic keys may be stored in a persistent storage (e.g., secure element) on the mobile device, whereas, the executable code for the wallet application may be stored in a system memory of the mobile device.

Having a number of entities in a distributed system introduces a number of challenges. For example, in the above example, if the wallet application on the mobile device is uninstalled, it may result in discrepancies in the shared state between the mobile device, the wallet provider and the back end server. For example, the executable code for the wallet application resident in the system memory may be removed, but the account related data stored in the secure element may not be removed in the same way. The sensitive account related data associated with the de-installed wallet application left over in the secure element may be accessible by a new wallet application installed on the mobile device. This can consequently raise security concerns.

In another example, if a new operating system is installed on a mobile device or a mobile device is reset, there may be old data left over in the persistent storage of the mobile device that may not have been removed.

Embodiments of the invention address this and other problems, individually and collectively.

BRIEF SUMMARY

The lack of coherency in the shared state of different entities may threaten the security of the sensitive information stored on one or more of the entities, potentially resulting in the misuse of the sensitive information.

Embodiments of the invention are directed to systems and methods for maintaining coherency between multiple entities in a distributed system. A coherency module automatically detects a change in state in a first entity, wherein the change in state relates to a change in functional code in the first entity. A synchronization message is transmitted to a second entity to synchronize data in the second entity with data in the first entity as a result of the change in state. The second entity is configured to synchronize the data in the second entity with the data in the first entity after receiving the synchronization message.

One embodiment of the invention is directed to a method comprising automatically detecting by a processor, a change in state in a first entity, wherein the change in state relates to a change in functional code in the first entity, and initiating a transmission of a synchronization message to a second entity to synchronize data in the second entity with data in the first entity, wherein the second entity is configured to synchronize the data in the second entity with the data in the first entity after receiving the synchronization message.

Another embodiment of the invention is directed to a first entity comprising a processor, and a computer readable medium coupled to the processor. The computer readable medium comprises code, executable by the processor to perform a method comprising automatically detecting a change in state in the first entity, wherein the change in state relates to a change in functional code in the first entity, and initiating a transmission of a synchronization message to a second entity to synchronize data in the second entity with data in the first entity, wherein the second entity is configured to synchronize the data in the second entity with the data in the first entity after receiving the synchronization message.

Another embodiment of the invention is directed to a system comprising a first entity, and a second entity, wherein the first and second entities are communicatively coupled to each other; and wherein the first entity comprises a processor, and a computer readable medium coupled to the processor. The computer readable medium comprises code, executable by the processor to perform a method comprising automatically detecting a change in state in the first entity, wherein the change in state relates to a change in functional code in the first entity, and initiating a transmission of a synchronization message to a second entity to synchronize data in the second entity with data in the first entity, wherein the second entity is configured to synchronize the data in the second entity with the data in the first entity after receiving the synchronization message.

These and other embodiments of the invention are described in further detail below.

DETAILED DESCRIPTION

Embodiments of the invention are directed to systems and methods for maintaining coherency between multiple entities in a distributed system. Embodiments of the invention are directed to a proactive model for synchronization of states among entities in a distributed system.

Embodiments of the invention provide a coherency protocol to synchronize different entities in a distributed system when a triggering event is detected. Typically, a triggering event results in a modification of a state associated with the entity. For example, a triggering event may include deletion of a program or installation of a new application or update of an existing application or change in security and privacy sensitive data (e.g., payment data, medical records, or user personal data). If the state is shared with other entities in the distributed system, a coherency protocol may be applied so that all end states in the system are coherent. The coherency protocol may include propagating a synchronization message comprising information related to the modification of state to all the entities that have access to the information or rely on the information. The entity receiving the synchronization message may take appropriate action based on the information. For example, the receiving entity may interrupt the triggering event causing the modification in state or take a suitable action to synchronize the data. If the state is not shared, no coherency may be required.

Referring back to the wallet example, as discussed in the background section, embodiments of the invention detect a change in state of the mobile device when the wallet application is uninstalled and initiate a synchronization message to the secure element (and other relevant entities) to remove the sensitive data associated with the wallet application. Thus, embodiments provide a proactive model to synchronize the entities when there is a change in the shared state in one of the entities.

Prior to discussing embodiments of the invention, description of some terms may be helpful in understanding embodiments of the invention.

An "entity" may include a device, an individual, a server computer, an application or a software module capable of changing its own state or a state associated with another entity communicatively coupled to it. Some non-limiting examples of an entity may include a mobile device (e.g., mobile phone, laptop, tablet, notebook, Personal Digital Assistant (PDA), mobile point-of-sale (mPOS) terminal, portable music player, etc.), a cloud server, a back-end server, an issuer, a payment processing network, a wallet provider, an application provider, a mobile network operator, a user, a secure element, a secure digital card, a smart card, a memory module, and so on.

A "state" may include a snapshot of an entity at a particular point in time. In some embodiments, the snapshot may include code and data associated with an execution (or runtime) environment of the entity at a point in time. In some embodiments, a state may represent a snapshot of a persistent storage (e.g., secure element) and a system memory (e.g., cache, operating system, etc.) associated with the entity. In some embodiments, a state may comprise internal configurable attributes which may be characterized by a particular state of code, or code and data. In some embodiments, a state may be represented as compilation of code and data in runtime context. In embodiments of the invention, a change in state in one entity may initiate a synchronization message to other entities in a system so that all the end states in the system are coherent. For example, a change in state on a mobile device occurred due to uninstalling a wallet application may initiate a synchronization message to all other entities (e.g., the secure element, wallet provider, issuer, and the payment processing network) in the system. In some embodiments, a state of an entity may depend upon a role of an entity initiating a change in the state and a context associated with the change. For example, a user may play a role by uninstalling the wallet application on the mobile device, thus changing the state of the entity. The sensitive data may be important in the context of the wallet application. In some embodiments, a change in state may represent a change in the configuration of the entity, e.g., hardware or software configuration. For example, a change in software configuration may include addition, update or removal of code such as installing, uninstalling or updating an application or updating the operating system on a device. Hardware configuration may include change in hardware interface, such as, removal of a SIM or a memory card on a mobile device.

"Coherent" may imply synchronized or consistent state of being. In this specification, the terms "coherent" and "synchronized" may be used interchangeably. In embodiments of the invention, coherent may imply having a same state across multiple entities. Two entities may not be coherent if their states are different even though they may share the same data. In one embodiment, coherency may be achieved by transmitting a message relating to a change in state in a first entity to a second entity that shares the same state.

"Synchronization" may or may not include having the same data. For example, if payment data is stored on a first entity and not on a second entity, the first entity may synchronize with the second entity by removing the payment data. Alternatively, the second entity may synchronize with the first entity by copying the payment data. The action taken by an entity may be based on the information included in the synchronization message.

A "distributed system" may include a system comprising a plurality of entities wherein the plurality of entities are communicatively coupled to each other. In some embodiments, two or more entities in the plurality of entities may share a common state. In some embodiments, two or more entities in the plurality of entities may share code and/or data. In one embodiment, a distributed system may also include two or more entities associated with the same device. For example, a distributed system associated with a mobile device may include a secure element as a first entity and system memory as a second entity.

An "execution environment" may imply a dynamic environment on a device for processing of applications and data. In this specification, the terms "execution environment" and "runtime environment" may be used interchangeably. When a software application is executed on a device, it may be in a runtime state. In this state, the application can communicate with a processor and a memory coupled to the device and access other resources associated with the device. In one embodiment, an execution environment may include a number of applications and/or processes running or executing at a point in time contributing to a dynamic environment. For example, an execution environment on a mobile device may comprise an environment at a point in time executing an email client application, a web application, a power management process, a video game application and an operating system for coordinating the execution of different processes and applications. In some embodiments, a runtime environment may be an independent component that may be used to keep track of the instructions being processed by a program code or a state of the program code (e.g., for debugging purposes).

"Code" may imply a set of instructions that may be executed by a processor for performing a given task. For example, a code may include a set of instructions to initiate a payment transaction using an account data stored in the secure element of a mobile device. In embodiments of the invention, a change in state relates to a change in functional code in the entity, with or without change in data. The functional code may imply code associated with a function of an entity. For example, adding or removing a song on a mobile device may not change the function of the device, whereas, adding or removing an application on a mobile device may change the function of the device. For example, by installing a payment application on a mobile device changes the functional code of the device to enable the mobile device to function as a payment device, and uninstalling the payment application on the mobile device changes the functional code of the device to disable the mobile device to function as a payment device.

"Data" may include information relating to numbers, characters or symbols that may be processed or stored by code on a computer readable medium, where the code is executable by a processor. Examples of data may include account numbers (e.g., credit card numbers, bank account numbers), dates of birth, user names, cryptographic keys, passwords, etc. In some embodiments, data may be encrypted.

A "context" may imply an environment associated with an information. For example, an expiration date by itself may be meaningless, whereas, if combined with a sixteen digit number in the context of a payment application, it may imply a valid payment account number.

A "role" may imply contribution of an entity for performing an action. For example, a user may play a role by installing a payment application on a mobile phone, a wallet provider may play a role by deleting an account number stored in the secure element of the mobile phone, or a mobile network operator may play a role by upgrading an application on a mobile phone. The role of an entity may be different in different contexts.

An "attribute" may include a characteristic associated with an entity at a particular point in time. An internal attribute of an entity such as a device may be characterized by a particular state of code, or code and data. For example, an attribute of a first device may be that the first device has "no sensitive personal account information or PAI information." Another attribute may be "change in access rights (e.g., logins or passwords)" of a device. In embodiments of the invention, another device such as a second device may be synchronized such that it has this attribute if it currently does not have this attribute.

A "policy" may include a set of predetermined conditions for synchronization of a shared state of an entity with other entities. Some non-limiting examples of a condition may include change of certain data (e.g., Personal Account Number (PAN), Personal Identification Information (PII), or cryptographic keys), addition, deletion or update of an application, a particular trigger (e.g., removal of a Subscriber Identity Module (SIM) from the phone), change in access rights (e.g., password or login change), etc. In embodiments of the invention, an entity may initiate a synchronization message to other entities based on a policy. Similarly, an entity consuming the synchronization message may analyze the policy to determine if it should synchronize with the initiating entity. In embodiments of the invention, a policy may be predetermined by one or more entities that are part of or associated with a distributed system, for example, a wallet provider, a mobile network operator, an additional service provider, an issuer, a payment processing network, or any other relevant entity capable of changing a state of the entity implementing the policy. In one embodiment, a policy may be installed on a device as part of a configuration of the device or as an update.

"Initiating a transmission" may include causing, either directly or indirectly, the sending of a message. For example, a message may be transmitted from a first entity to a second entity directly. In another example, a message may be transmitted from a first entity to an intermediate entity, which may in turn transmit the message to a second entity. In embodiments of the invention, a message may be transmitted using any standard protocol, e.g., TCP/IP (Transmission Control Protocol/Internet Protocol), UDP (User Datagram Protocol), UPnP (Universal Plug and Play), HTML (HyperText Markup Language), etc.

A "mobile device" may include any electronic device (e.g., a client device) that may be operated by a user, which may also provide remote communication capabilities to a network. The mobile device may be configured to enable a user download an application from a server (e.g., web server) via a communication network (e.g., the Internet). The mobile device may further be configured to install, uninstall or execute one or more applications. Examples of mobile devices include mobile phones, PDAs, tablet computers, notepads, net books, laptop computers, portable music players, hand-held specialized readers, mPOS terminals, etc.

An "operating system" may include program code to implement the basic functionalities of the device on which the operating system is installed. For example, an operating system for a mobile device may include code for implementing the functionality of a phone (e.g., making calls, texting, etc.). The operating system may further be configured to allow execution of different applications on a device, installation of new applications or removal of installed applications. In some implementations, the operating system may implement one or more network stacks for communicating with a network, wherein the network comprises one or more entities. An example of a networking protocol is the open standards interface (OSI) networking protocol. A network stack may be capable of communicating over a variety of wired and wireless protocols, such as Ethernet, 3GPP, 3GPP2, CDMA, LTE, Bluetooth, NFC, etc.

A "server computer" may typically be a powerful computer or cluster of computers. For example, the server computer can be a large mainframe, a minicomputer cluster, or a group of servers functioning as a unit. In one example, the server computer may be a database server coupled to a web server.

A "user" may be an entity, such as, an individual that may be associated with one or more payment accounts and/or mobile devices. The user may be able to download, install, uninstall or update an application, such as a wallet application on a mobile device. In some embodiments, the user may need access rights to access the mobile phone for downloading, installing, uninstalling or updating an application on the mobile device.

It is desirable to maintain coherency between different states of a distributed system when there are multiple entities involved. For instance, lack of coherency for a security flag across multiple entities may threaten security of the device causing misuse of user information and data. A change in state in one of the entities needs to be reflected in all the relevant entities such that all the entities in the distributed system are in synchronization and have the same information. A few examples of a change in state in different entities are discussed below.

In one example, changing an administrator password on a computer by an unauthorized entity may change a state of the computer since the configuration of the computer has changed even though the data stored on the computer may not have changed. For example, the data (e.g., songs, music, videos, email, etc.) on the computer may be synchronized automatically with the cloud, but the state has changed due to change in the functional code, i.e., by changing the access rights on the computer. In this example, the unauthorized entity plays a role by changing the password. In embodiments of the invention, a synchronization message may be sent to a server indicating that the administrator for the computer has changed so that the server can take the necessary action, e.g., stop unauthorized access to the computer.

In another example, if an email client (e.g., gmail©, yahoo mail©, outlook©, etc.) is changed on a computing device, the state of the computing device may change even though the data (emails) itself may not have changed. In this example, a change in the email client may initiate a message to a user of the computing device and the email service providers indicating that the email client on the computing device has changed.

In another example, when there is a change in hardware configuration of a device (e.g., removal of a SIM in a mobile phone), state of the device may change due to change in the configuration of the device, even though the data stored on the device may not change. In this example, a synchronization message may be initiated to a mobile network provider indicating that the configuration of the device has changed.

In one example, a trusted service manager (TSM) may send an update of a contactless application stored in a secure element of a mobile device. The TSM may be associated with a mobile network operator and/or a service provider. This may result in a change in state of the secure element and may require synchronization with a wallet provider, an issuer, a payment processing network or any other relevant entity that may be associated with the contactless application. Embodiments of the invention may broadcast a synchronization message comprising information related to the update of the contactless application to all the relevant entities associated with the contactless application so that all the relevant entities are coherent, i.e., aware of the update.

Figure 1:
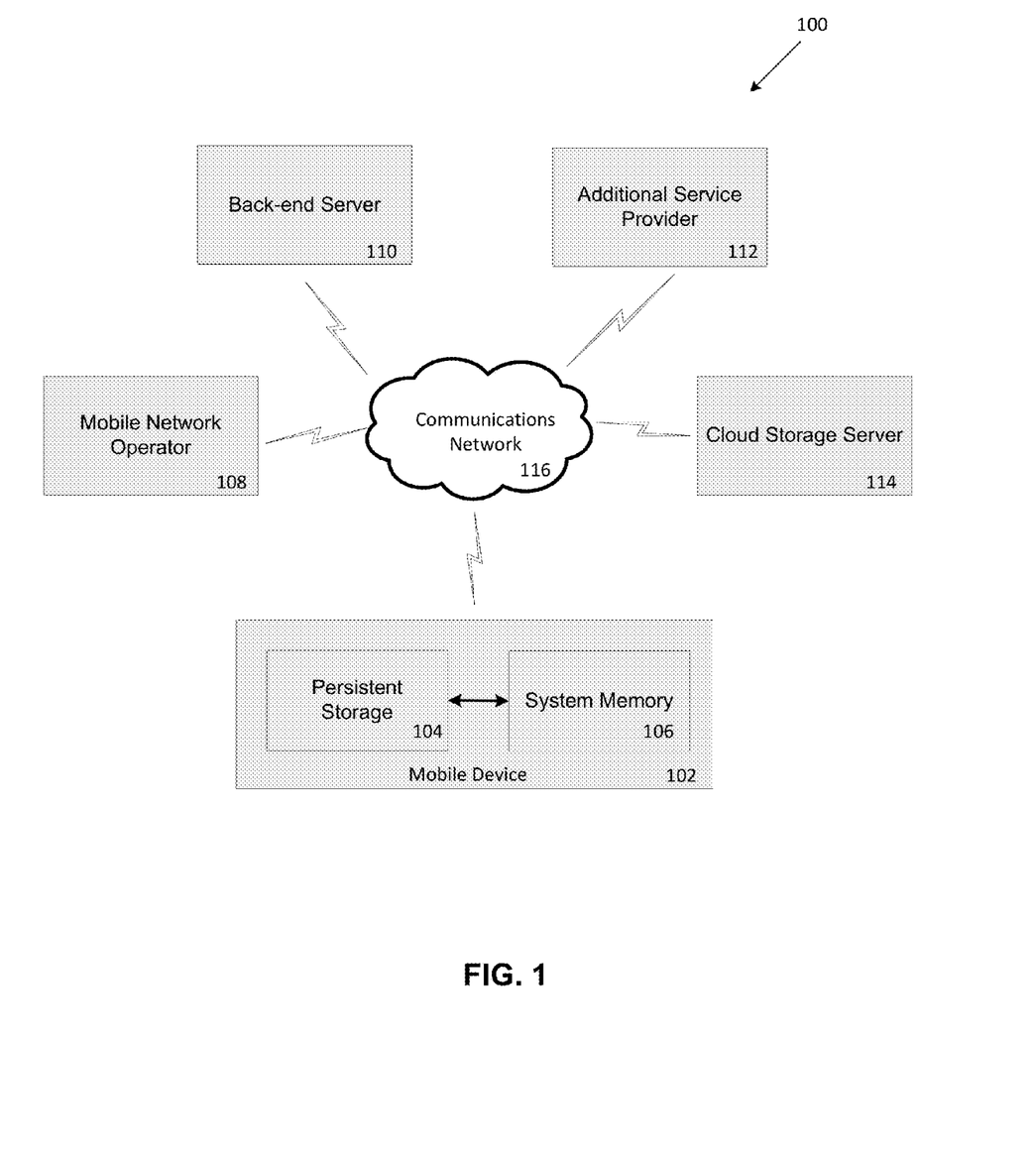
FIG. 1 shows various exemplary entities in an exemplary distributed system in one embodiment of the invention.

FIG. 1 shows various exemplary entities in an exemplary distributed system in one embodiment of the invention.

An exemplary distributed system 100 may comprise a mobile device 102, a mobile network operator (MNO) 108, a back-end server 110, an additional service provider 112 and a cloud storage server 114 communicatively coupled to each other via a communications network 116. The communications network 116 may be based on one or more communication protocols, such as, Internet Protocol (TCP/IP, UDP, etc.), wireless communication protocol (CDMA, LTE, WiFi, etc.), Universal Plug and Play (UPnP), HTTP, XML, and such. Note that the distributed system as illustrated in FIG. 1 is exemplary only and any combination of data storage, processing and communication are possible. For example, the mobile device 102, and the mobile network operator 108 may communicate with each other via a cellular network or a Wi-Fi connection, whereas the mobile device 102 and the back-end server 110 may communicate via a TCP/IP network.

The mobile device 102 may further comprise a persistent storage 104 and a system memory 106. The persistent storage 104 may include non-volatile or semi-volatile storage, such as a removable Secure Digital (SD) card, a smart card, a SIM (Subscriber Identity Module) card, a read-only memory (ROM), a flash memory, a Secure Element (SE), etc., that retains the stored information in the absence of power. In some embodiments, the secure element may be implemented either as a separate smart card chip, in the SD card or in the SIM card. The secure element may provide secure memory and execution environment for sensitive information (e.g., financial account numbers, cryptographic keys, secure applications, etc.) In some embodiments, the persistent storage 104 may also include a cache memory. The system memory 106 may include non-persistent or volatile storage such as a cache, SRAM, DRAM, etc. that requires power to maintain the stored information. At any given instant, the system memory 106 may include a run time environment and data tied to the run time environment. Note that the mobile device 102 may comprise other components and other configurations of memory that are not shown here for ease of simplicity.

The mobile network operator 108 may be configured to provide wireless communication services to a subscribed user through the mobile device 102, such as cellular voice calls, texting, video communication, mobile network, internet, etc., via a cellular network that may be part of the communications network 116. The subscribed users may use a chip (e.g. a SIM) in their mobile device (e.g., the mobile device 102) to access services provided by the MNO 108. In some embodiments, the mobile network operator 108 may be configured to work with one or more mobile virtual network operators to provide voice, data, multimedia or any such services to the user. The cellular network may utilize wireless communication protocols, such as CDMA, GSM, 3GPP, 3GPP2, LTE or any other suitable communication protocol.

The back-end server 110 may be a server associated with one or more entities, such as, a payment processing network, an issuer (e.g., a bank), an acquirer, etc. In some embodiments, the back-end server 110 may represent a plurality of servers configured to process financial transactions initiated by the mobile device 102.

The additional service provider 112 may be a server associated with one or more entities for providing additional services. For example, the additional server provider 112 may be a wallet provider, an email server, a social media network server, a merchant, a web server, etc. In some embodiments, the additional server provider 112 may be associated with a Trusted Service Manager (TSM).

The cloud storage server 114 may be a remote storage for storing and managing data. The cloud storage server 114 may be configured to work with the mobile device 102, mobile network operator 108, back-end server 110, and the additional service provider 112 for providing data storage and processing.

Embodiments of the invention provide a coherency protocol to provide coherency between various devices and entities in the distributed system 100. For example, a change in state may be detected between different entities within a device (e.g., between the persistent storage 104 and the system memory 106 of the mobile device 102) or between two devices (e.g., the mobile device 102 and the back-end server 110). In some embodiments, the coherency protocol may be implemented by configuring each entity to include a coherency module and policies for synchronization of entities. In embodiments of the invention, each entity may be configured to transmit a synchronization message to other entities in the distributed network 100 based on the policy as well as receive and process a synchronization message from other entities.

Embodiments of the invention for maintaining coherency between different states in a distributed system may be implemented in software and/or firmware as a coherency module. In some embodiments, a coherency module may be a collection of mechanisms for maintaining coherency across different entities in the system, residing in one or multiple locations in each entity. For instance, in one embodiment, the method for maintaining coherency in the distributed system may be implemented as a module in the operating system kernel with high level of privilege and access to most of the system software, hardware and storage across each entity in the distributed system. In other implementations, embodiments of the invention may be implemented using any suitable means that would ensure a high level of security for the execution and storage of the application and data associated with the coherency module. In one embodiment, the integrity and authenticity of the coherency module may be verified statically at boot time of the device or dynamically at run-time.

Figure 2:
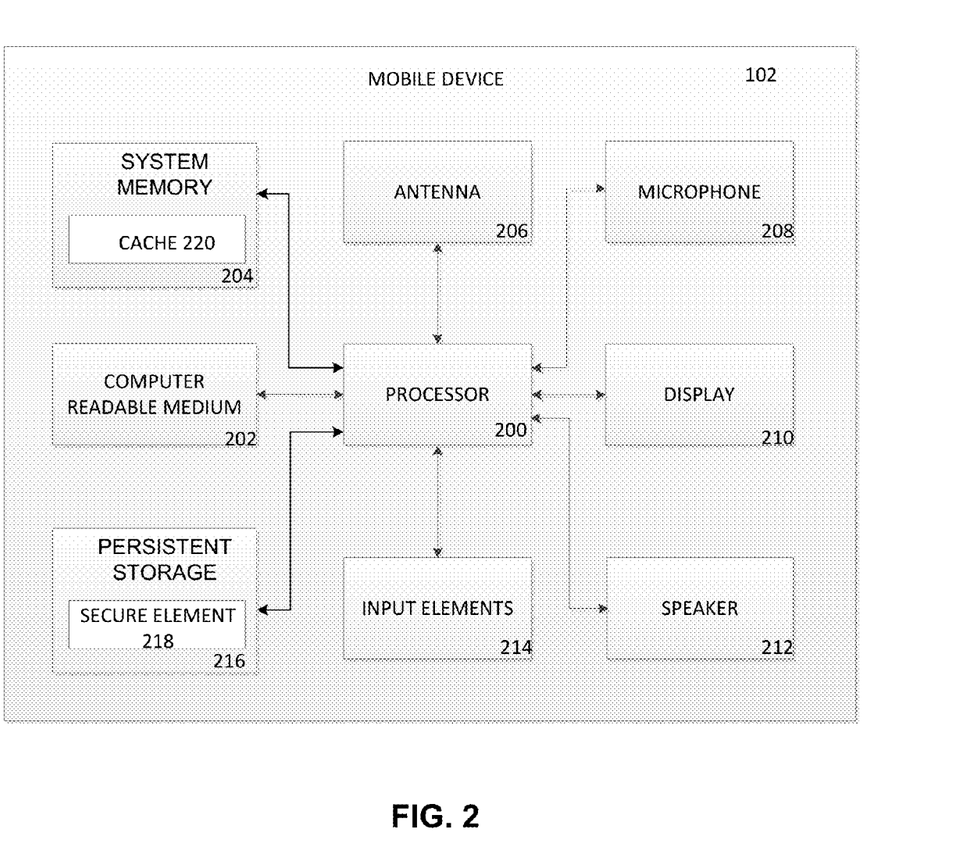
FIG. 2 illustrates at least some of the components of the exemplary mobile device in one embodiment of the invention.

FIG. 2 illustrates at least some of the components of the exemplary mobile device 102 in one embodiment of the invention.

The mobile device 102 may comprise a computer readable medium (CRM) 202, a system memory 204, an antenna 206, a microphone 208, a display 210, a speaker 212, input elements 214, persistent storage 216 and these may all be operatively coupled to a processor 200.

The mobile device 102 may be a mobile phone, a tablet, a PDA, a notebook, a laptop, a portable music player, an mPOS terminal, or any such electronic device capable of communicating and transferring data or control instructions via a wireless network (e.g., cellular network, internet, etc.) and short range communications (e.g., Near Field Communication). In some embodiments, the mobile device 102 may be configured as a communication device that can allow a user to log on to a website and download an application and/or run different applications. In some embodiments, the mobile device 102 may also be configured as a payment device that may be used to make payments, conduct a financial transaction, etc.

The system memory 204 may include volatile or non-persistent storage (e.g., a RAM) and may include a cache 220. The cache 220 may be used for frequently used code and/or data. In some embodiments, the system memory 204 may be used to store data segments, stacks and executable code for applications, etc.

In some embodiments, the persistent storage 216 may include a secure element 218. The secure element 218 may be implemented as a separate secure smart card chip, in a SIM/UICC (Universal Integrated Circuit Card), or in a removable card (e.g., Secure Digital card). The secure element 218 may be configured to securely store applications (e.g., wallet application), data (e.g., PAI, PII, cryptographic data for key management) and provide for secure execution of applications. In some embodiments, the secure element 218 may be used for contactless transactions by transmitting and receiving wireless data or instructions using a short range wireless communications capability (e.g., Near Field Communications). In one embodiment, when the mobile device 102 is configured as an mPOS terminal, a crypto engine may be stored in the secure element 218. In some embodiments, the persistent storage 216 may also include a cache memory.

The processor 200 may be configured to execute instructions or code in order to implement methods, processes or operations. The processor 200 may comprise any suitable or type of data processor(s).

The CRM 202 may comprise code executable by the processor 200 for implementing methods using embodiments of the invention. In one embodiment, the processor 200 may be configured for processing the functions of a phone. The CRM 202 may be implemented as a separate entity or it may be part of the system memory 204 and/or the persistent storage 216. In some embodiments, the CRM 202 may include non-volatile, non-writable storage area (e.g., NAND Flash) where the firmware/operating system may reside. The CRM 202 may be internal to the mobile device 102 or hosted on a remote server and accessed wirelessly by the mobile device 102. In some embodiments, the CRM 202 may include code for implementing the coherency protocol.

The speaker 212 may be configured to allow the user hear voice communication, music, etc., and the microphone 208 may be configured to allow the user transmit her voice through the mobile device 102.

The display 210 may allow a user to view text messages, phone numbers, images, and other information. In some embodiments, a graphical user interface may be provided on the display 210 for the user to initiate a payment transaction using a wallet application stored in the system memory 204 or hosted remotely on a server associated with the additional service provider 112.

The input elements 214 may be configured to allow the user to input information into the device (e.g., using a keypad, touch screen, mouse, etc.). In some embodiments, the microphone 208 may be part of the input elements 214. For example, the user may use a keypad or touch screen to provide a credit card number, an expiration date, a CW, a PIN, etc. to set up a wallet application. In some embodiments, the user may want to delete an application on the mobile device 102 (e.g., the wallet application) using the input elements 214 and the graphical user interface provided on the display 210.

The antenna 206 may be configured for wireless data transfer between the mobile device 102 and other entities, such as, the mobile network operator 108, back-end server 110, cloud storage server 114 and additional service provider 112 via the communications network 116. In some embodiments, the antenna 206 may be used for downloading an application through the communications network 116 (e.g., the Internet) from a web server (e.g., associated with the additional service provider 112).

Figure 3:
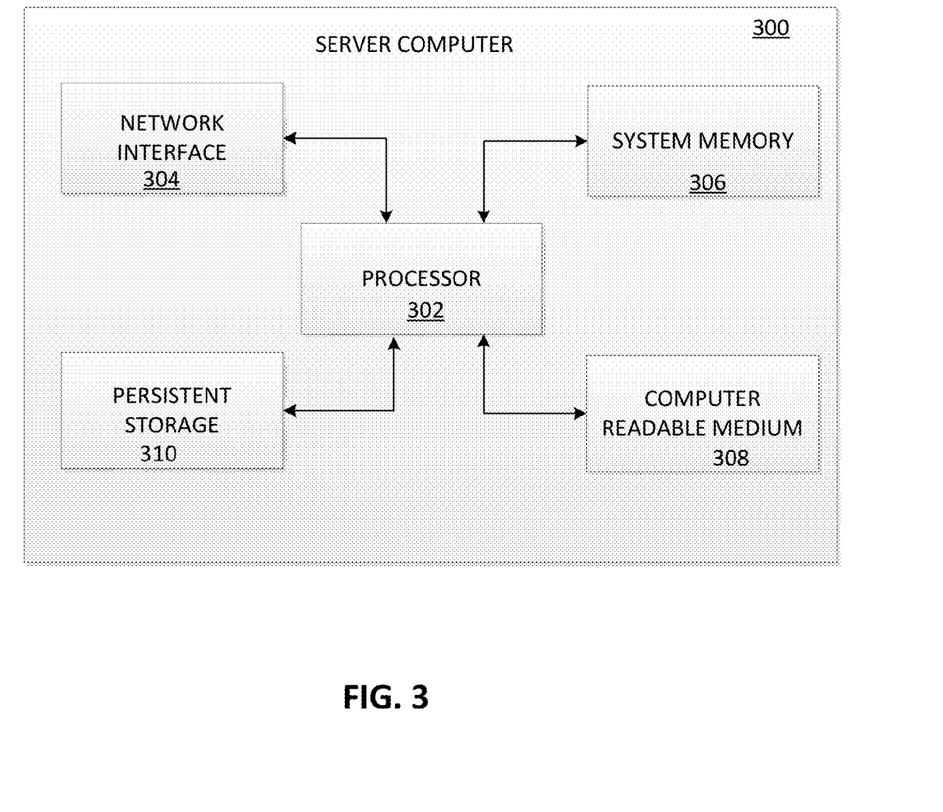
FIG. 3 illustrates at least some of the elements of a server computer in accordance with embodiments of the invention.

FIG. 3 illustrates at least some of the elements of a server computer in accordance with embodiments of the invention.

A server computer 300 may comprise a processor 302, a network interface 304, a system memory 306, a computer readable medium 308 and persistent storage 310. The server computer 300 may be associated with one or more entities in the distributed system 100, such as, the mobile network operator 108, back-end server 110, additional service provider 112 or the cloud storage server 114. For example, the server computer 300 may be configured to process a financial transaction initiated by the mobile device 102. In one embodiment, the server computer 300 may be configured to receive a synchronization message from another device to synchronize with that device.

The network interface 304 may be configured to interface with other entities, such as, the mobile device 102 or another server in the distributed system 100 using the communications network 116.

The system memory 306 may include volatile or non-persistent storage (e.g., a RAM, DRAM, cache, etc.) and may be used to store executable code for applications, data segments, or stacks etc.

The persistent storage 310 may include non-volatile memory such as read-only memory (see ROM), most types of magnetic computer storage devices (e.g. hard disks, floppy discs and magnetic tape), optical discs, etc. In some embodiments, the persistent storage 310 may include or be communicatively coupled to a database (e.g., in cloud) for storing data related to users financial and personal information.

The processor 302 may be configured to execute instructions or code in order to implement methods, processes or operations.

The CRM 308 may comprise code executable by the processor 302 for implementing methods using embodiments of the invention. The CRM 302 may be implemented as a separate entity or it may be part of the system memory 306 and/or the persistent storage 310. In some embodiments, the CRM 308 may include non-volatile, non-writable storage area where the firmware/operating system may reside. In some embodiments, the CRM 308 may include code for implementing the coherency protocol.

Figure 4:
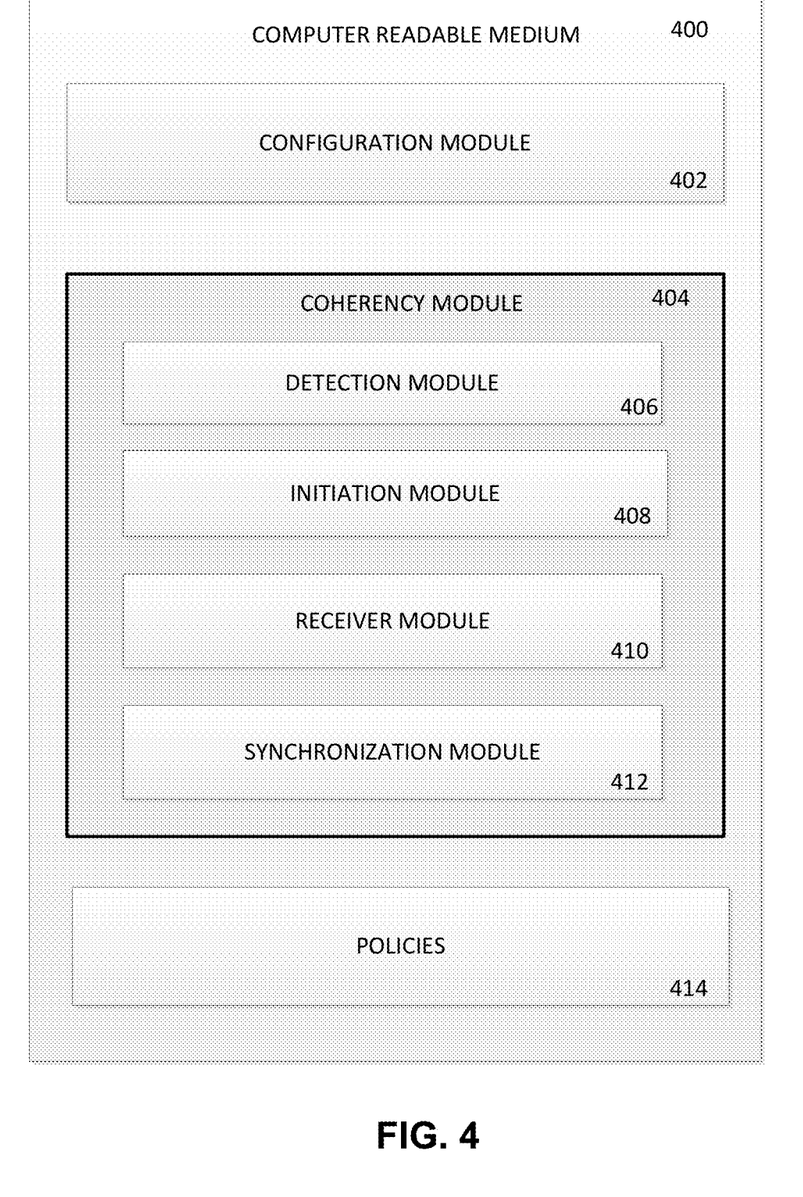
FIG. 4 shows an exemplary computer readable medium in accordance with some embodiments of the invention.

FIG. 4 shows an exemplary computer readable medium in accordance with some embodiments of the invention.

A computer readable medium (CRM) 400 may comprise code, executable by a processor for implementing methods using embodiments of the invention. The computer readable medium 400 may be part of the computer readable medium 202 of the mobile device 102 and/or the computer readable medium 308 of the server computer 300. In one embodiment, the computer readable medium 400 may also be part of the secure element 218 and any other entity capable of participating in the coherency protocol by executing a set of instructions by a processor. In embodiments of the invention, the computer readable medium 400 may configure each entity in the distributed system 100 comprising the computer readable medium 400 to implement the coherency protocol to synchronize all the end states in the distributed system 100.

The computer readable medium 400 may comprise a configuration module 402, a coherency module 404 and policies 414. The coherency module 404 may further comprise a detection module 406, an initiation module 408, a receiver module 410 and a synchronization module 412.

The configuration module 402 may allow for configuration of an entity for implementing the coherency protocol in embodiments of the invention. For example, when an application is installed on an entity or a device or a device is configured, the configuration module 402 may determine if the entity shares code or data with another entity. The configuration module 402 may further install the coherency module 404 and the policies 414 on all the entities that share code or data so that the coherency protocol may be implemented based on the policies 414. In some embodiments, the configuration module 402 may be configured to detect new entities in the distributed system and configure the new entities, e.g., by installing the coherency module 404 and the policies 414. In one embodiment, the configuration module 402 may be downloaded from a secure server (e.g., a web server) by an entity having appropriate access privileges. The secure server may be associated with the mobile network operator 108, the back-end server 110 or the additional service provider 112.

The coherency module 404 may be configured to provide coherency among different entities in a distributed system.

In one embodiment, coherency may be achieved by broadcasting a synchronization message to all the entities having a shared state, when there is a change in state in one of the entities. The relevant entities may be configured to take the appropriate action based on the synchronization message. In another embodiment, a first entity can query a second entity when establishing a connection with the second entity to determine a state of the second entity. If there is discrepancy in the states, the two entities can resolve the conflict either by committing to a new state or aborting and rolling back to a previous state so that the end states are coherent. In some embodiments, one entity may have higher precedence over other entities in resolving the conflict, e.g., based on operational regulations. For example, an event occurred by an issuer may have higher precedence over an event occurred by a wallet provider.

The detection module 406 may be configured to detect a change in a current state of an entity. When a triggering event occurs on an entity, state of the entity may be changed from a first (current) state to a second state. In embodiments of the invention, a change in state relates to a change in functional code in the entity. For example, the change in state may include change in the code and data associated with the run time environment and may be further associated with a role and a context. For example, a change in state of the secure element 218 may be detected when an update of a contactless application stored in the secure element 218 is provided by a TSM. In this example, the TSM plays a role for triggering the change in the context of the contactless application.

The initiation module 408 may be configured to initiate a transmission of a synchronization message to all the relevant entities in a distributed network. In one example, if a new key is stored in the secure element 218, thus changing the state of the secure element 218, a synchronization message relating to the new key may be sent to the servers associated with the wallet provider and the payment processing network. In another example, if a crypto engine in a mobile POS terminal is updated, a change in state is detected and a synchronization message is sent by the mobile POS terminal to the servers associated with the issuer and the payment processing network informing of the update in the crypto engine in the mobile POS terminal. In one embodiment, the synchronization message may be transmitted via an intermediate entity. In another embodiment, the synchronization message may be transmitted directly to a second entity. Referring back to the TSM example, the synchronization message may be transmitted directly by the secure element 218 (or by the TSM) to a wallet provider associated with the additional service provider 112 and the issuer/payment processing network associated with the back-end server 110. Alternatively, the synchronization message may be transmitted indirectly to the back-end server 110. For example, the secure element 218 may send a synchronization message to the back-end server 110 via the additional service provider 112 (wallet provider).

It is to be noted that synchronization may be achieved using any of the standard protocols. Furthermore, standard protocols such as TCP, UPnP, UDP, HTML, etc. may be used for broadcasting of synchronization messages to difference devices or entities, when a change in state is detected in one of the entities. Similarly, messages may be exchanged within a device between different entities using IPC (Inter-process Communication) for synchronization, e.g., between the secure element 218 and other entities in the mobile device 102.

The receiver module 410 may be configured to receive the synchronization message at a second entity sent by a first entity for synchronizing the data with the first entity due to a change in state of the first entity. In one embodiment, data in the second entity may be associated with a state in the second entity. It is to be noted that the receiver module 410 may be implemented as a snooper, a listener, a consumer or as a client module for receiving broadcasted or published messaged in a distributed system.

The synchronization module 412 may be configured to synchronize the data in a second entity with the data in the first entity based on the synchronization message sent by the first entity. The synchronization module 412 may utilize any standard protocol to synchronize the data between the two entities. In one embodiment, the synchronization module 412 may be configured to synchronize the state in the second entity to be coherent with the state in the first entity. In some embodiments, synchronization of state includes taking appropriate action by a second entity to synchronize to the change in state in the first entity. For example, when a wallet application is removed from the system memory 204 of the mobile device 102, a state in the mobile device 102 is synchronized with a state in the wallet provider by removing the sensitive data associated with the wallet application from the secure element 218 of the mobile device 102.

In some embodiments of the invention, principals of transaction based coherency protocol may be used to synchronize different states in a distributed system. Transitional start and transitional commit model may be used to maintain coherency between different entities. In one embodiment, a commit operation may start when a triggering event is detected. If no data inconsistencies are found, a commit operation is completed successfully so that all endpoint states in the system are coherent. If data inconsistencies are found, an abort is executed and the system reverts back to a previous coherent state. If in-coherency is detected between different states of the device, forcing transaction commit may guarantee that the system will be coherent either by completing or aborting a commit operation.

An abort and rollback transaction backs out uncommitted changes to restore the data consistency that existed before the current transaction was initiated. In one embodiment, the abort transaction is triggered by anomalies or inconsistencies detected in the system and are an indication that the system needs to be rolled back to the previous state to maintain coherency. In one embodiment, anomalies are concurrency anomalies, such as, two separate transactions modifying the same data concurrently. Some other types of anomalies could be caused by malicious activities such as credit card fraud, cyber intrusion, system breakdown, etc.

The policies 414 may comprise a set of predetermined conditions for implementing the coherency protocol. Once a change in the current state is detected in an entity, the change may or may not require synchronization with other entities based on the policies 414. For example, a policy may include a condition to synchronize the entities if the entities share a common state and the change is associated with a payment account number. Another condition in the policy may specify to synchronize the entities if the entities share a common state and the change is due to a reconfiguration of the entity. Another condition in the policy may specify to not synchronize two entities if they do not share a common state. In one example, the policy may specify to act upon a change in the admin password but not on the guest password after receiving a synchronization message.

Figure 5:
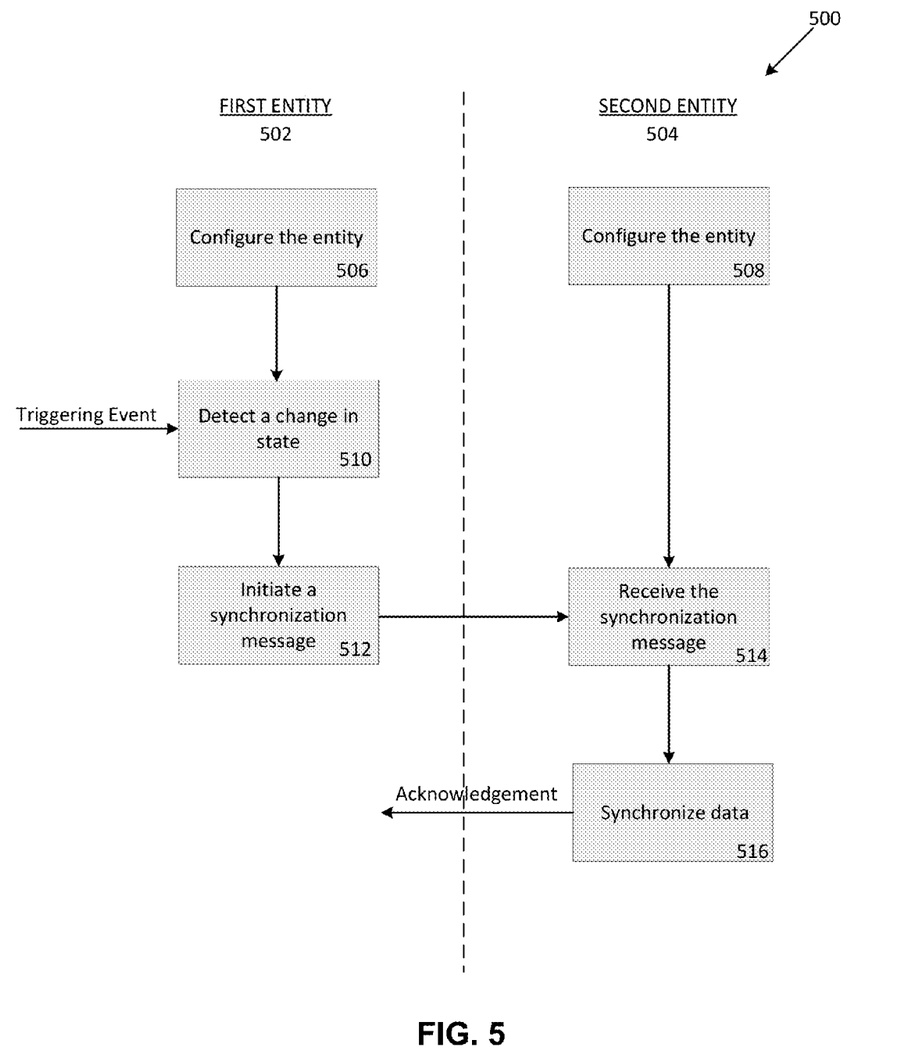
FIG. 5 illustrates a flowchart for implementing a coherency protocol in one embodiment of the invention.

FIG. 5 illustrates a flowchart 500 for implementing a coherency protocol in one embodiment of the invention.

In step 506, a first entity 502 may be configured to participate in a coherency protocol in embodiments of the invention. In one embodiment, the configuration module 402 may be installed on the first entity 502 to configure the first entity 502 to participate in the coherency protocol. For example, the configuration module 402 may be downloaded when an entity is first configured (e.g., after a mobile device is purchased).

In step 508, a second entity 504 may be configured to participate in a coherency protocol in embodiments of the invention. In one embodiment, the configuration module 402 may configure the second entity 504 by enabling the second entity 504 to participate in the coherency protocol. Note that the steps 506 and 508 may occur concurrently or at different times. For example, the coherency module may be installed on a mobile device when the mobile device is first configured after it is purchased or after a factory reset. If a laptop is later added as the second entity 504, the laptop may be configured by the configuration module 402 on the mobile device.

In step 510, the first entity 502 may detect a change in state based on a triggering event. In embodiments of the invention, the change in state relates to a change in functional code in the first entity 502. For example, the first entity 502 may be the mobile device 102. The mobile device 102 may be in a first state (current state), when a wallet application previously installed on the mobile device 102 is uninstalled by a user of the mobile device 102. This may result in a change in state of the mobile device 102. For example, by uninstalling the wallet application may change the state of the system memory 204 and/or the persistent storage 216 since the code associated with the wallet application has been removed thus changing the functional code of the mobile device 102.

In step 512, as a result of the change in state, the first entity 502 may initiate a synchronization message to the second entity 504. Referring back to the previous example, uninstalling the wallet application on the mobile device 102 may require synchronization with other entities that share code and data with the wallet application. For example, sensitive data (e.g., payment account data, user personal data) associated with the wallet application may be stored in the secure element 218 of the mobile device 102. When the wallet application is removed, any data associated with the wallet application stored in the secure element 218 (and any other entities) may not have been removed. Thus, a synchronization message is sent to the secure element 218 and other entities (e.g., a wallet provider, an issuer or a payment processing network) that shared code and data associated with the wallet application so that each entity can take the appropriate action to synchronize with the change in state in the mobile device 102.

In step 514, the second entity 504 may receive the synchronization message. In one embodiment, the second entity 504 receives the synchronization message if the second entity 504 shares code and data with the first entity 502. For example, the second entity 504 may be the wallet provider. In one embodiment, the synchronization message may include information related to the modification of the state in the first entity. For example, the synchronization message may include removal of the wallet application on the mobile device 102.

In step 516, the second entity 504 may synchronize the data with the first entity 502. For example, the wallet provider may take appropriate actions to remove the sensitive data (e.g., payment account data, user personal data) associated with the wallet application stored in the secure element 218 of the mobile device 102. In some embodiments, an acknowledgement message may be sent to the first entity 502 from the second entity 504 after the synchronization is complete. For example, the acknowledgement message may indicate that the sensitive data is removed from the secure element 218. This may result in denial of any subsequent payment transactions made by the mobile device 102.

In some embodiments, the second entity 504 may not synchronize the data with the first entity 502 due to a conflict. For example, the data associated with the wallet application may be shared with or used by another application. In such cases, the conflict can be resolved between the first entity 502 and the second entity 504 using any standard protocol so that a coherent state may be achieved.

Figure 6:
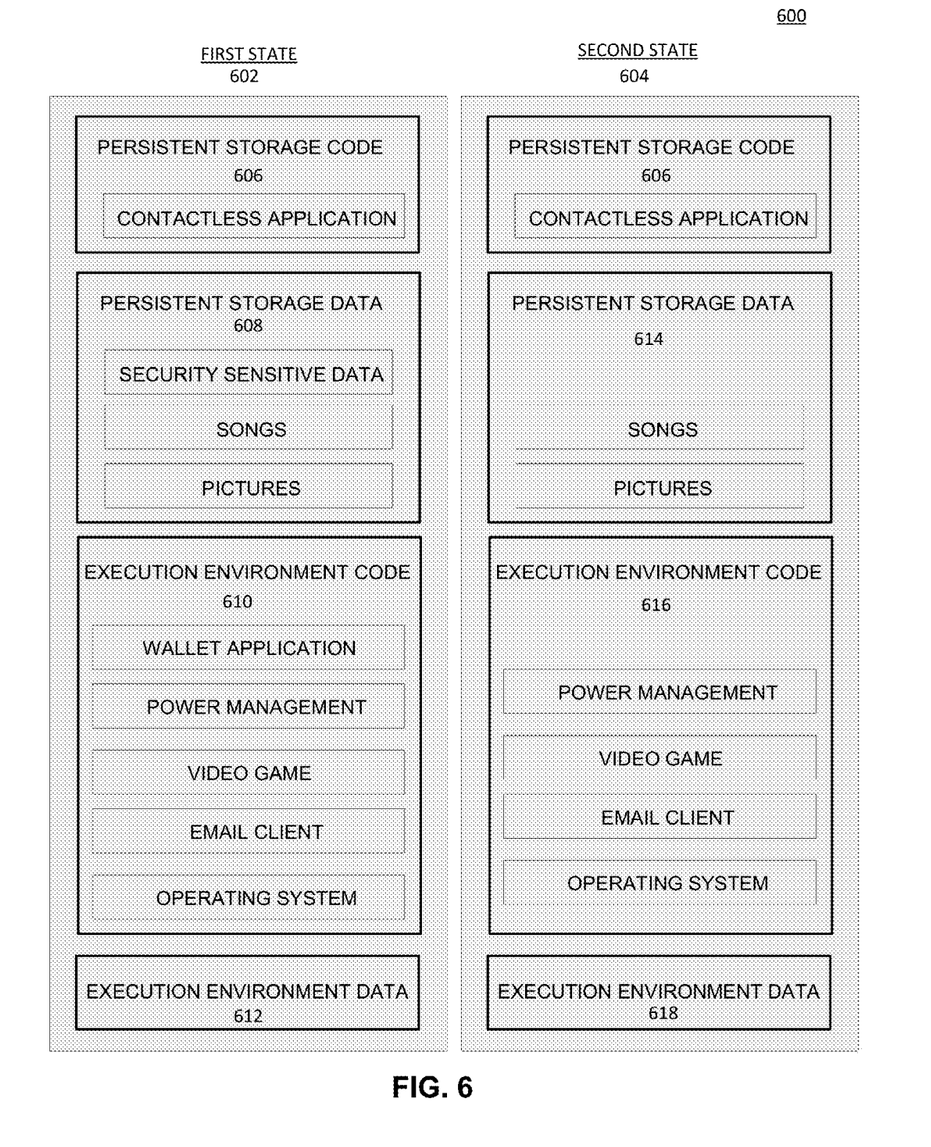
FIG. 6 illustrates an exemplary change in state, in one embodiment of the invention.

FIG. 6 illustrates an exemplary change in state, in one embodiment of the invention.

The exemplary figure shows a first state 602 of an entity, such as the mobile device 102, at a particular point in time. For example, the first state 602 may include a snapshot of a persistent storage code 606, a persistent storage data 608, an execution environment code 610 and an execution environment data 612. The persistent storage code 606 may include code for a contactless application. The persistent storage data 608 may include sensitive data, songs and pictures. In one embodiment, the persistent storage code 606 and the persistent storage data 608 are stored in the persistent storage 216 on the mobile device 102. For example, the sensitive data may be stored on the secure element 218 and the songs and pictures may be stored on a SD card (not shown).

The execution environment code 610 may include state of the code for a wallet application, a power management process, a video game, an email client and an operating system. The execution environment data 612 may include data tied to the execution environment code 610. For example, the data may include current scores for the video game, an email, etc. Note that the first state 602 of the mobile device 102, as shown in FIG. 6, is for illustrative purposes only and it is to be understood that a state of the mobile device 102 at a point in time may include additional code and data at that point in time.

If the wallet application is uninstalled on the mobile device 102, the exemplary first state 602 of the mobile device 102 changes to an exemplary second state 604, as shown in FIG. 6. In embodiments of the invention, the second state 604 includes a persistent storage data 614, an execution environment code 616 and an execution environment data 618 that has been synchronized. For example, removal of the wallet application in the execution environment code 616 resulted in the removal of the sensitive data in the persistent storage data 614 due to the change in the functional code of the mobile device 102. Note that the execution environment data 618 may or may not be the same as the execution environment data 612 due to the change in the execution environment code.

Some other examples of triggering events that may cause a change in state include flushing of mobile application cache data, update of a mobile network operator, side channel attacks, etc. Mobile application caches may be used to speed up accessing certain information, e.g., web applications, instead of accessing them from a server through a network connection by storing frequently used applications in application caches. In certain cases, when an application cache is flushed to clear the contents or reload new contents, embodiments of the invention apply the coherency protocol to synchronize all the end states in the system. Side channel attacks may be based on information provided by timing information, power consumption, electromagnetic leaks and fault analysis, etc., which could be used to break the system. Embodiments of the invention provide improved device security by providing coherency among different entities in the system in case of a triggering event caused by a side channel attack.

Figure 7:
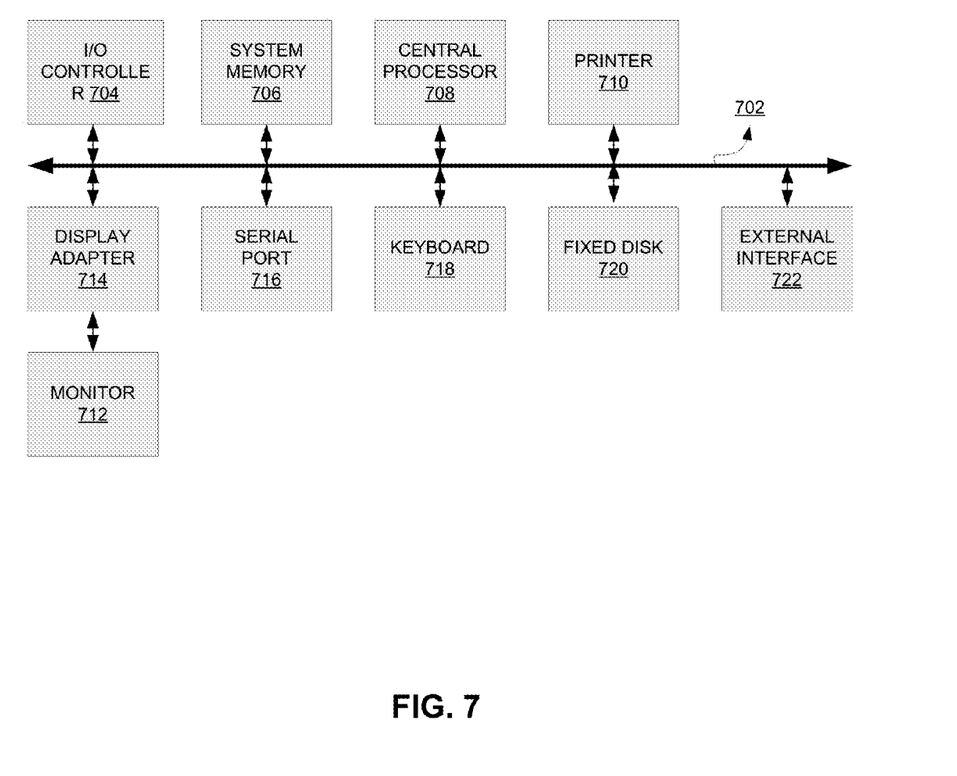
FIG. 7 is a block diagram of a computer apparatus.

FIG. 7 is a high level block diagram of a computer system that may be used to implement any of the entities or components described above. The subsystems shown in FIG. 7 are interconnected via a system bus 702. Additional subsystems include a printer 710, keyboard 718, fixed disk 720, and monitor 712, which is coupled to display adapter 714. Peripherals and input/output (I/O) devices, which couple to I/O controller 704, can be connected to the computer system by any number of means known in the art, such as a serial port. For example, serial port 716 or external interface 722 can be used to connect the computer apparatus to a wide area network such as the Internet, a mouse input device, or a scanner. The interconnection via system bus 702 allows the processor 708 to communicate with each subsystem and to control the execution of instructions from system memory 706 or the fixed disk 720, as well as the exchange of information between subsystems. The system memory 706 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

All patents, patent applications, publications, and descriptions mentioned above are herein incorporated by reference in their entirety for all purposes. None is admitted to be prior art.

What is claimed is:

1. A method for maintaining coherency, the method comprising:
    automatically detecting by a processor of a user device, a removal of a wallet application at the user device, wherein the removal of the wallet application changes functional code of the user device, and wherein the processor of the user device automatically detects the removal of the wallet application at the user device by identifying a change in state between a persistent storage at the user device and a system memory at the user device;
    initiating a transmission of a synchronization message by the user device to a second entity to apply a coherency protocol for synchronizing end states in the second entity with data in the user device;
    in response to the automatically detecting the removal of the wallet application, receiving an instruction from the second entity to delete persistent sensitive data associated with the wallet application;
    in response to the automatically detecting the removal of the wallet application, deleting the persistent sensitive data associated with the wallet application, wherein the persistent sensitive data being deleted is data that the wallet application uses when the functional code associated with the wallet application is executed,
    wherein the second entity is configured to synchronize the data in the second entity with the data in the user device based upon a predetermined policy with high level of privilege, the predetermined policy specifying a condition to synchronize the second entity and the user device if the second entity and the user device share a common state and the change is due to a reconfiguration of the user device; and
    if there is discrepancy in the end states, the second entity and the user device resolve the discrepancy either by committing to a new state or aborting and rolling back to a previous state so that the end states are coherent.

2. The method of claim 1, wherein the second entity is a wallet provider.

3. The method of claim 1, wherein initiating the transmission of the synchronization message to the second entity comprises transmitting the synchronization message from the user device to the second entity.

4. The method of claim 1, wherein initiating the transmission of the synchronization message to the second entity comprises transmitting an initiation message to an intermediate entity, wherein the intermediate entity transmits the synchronization message to the second entity.

5. The method of claim 4, wherein the intermediate entity is a trusted service manager (TSM).

6. The method of claim 1, wherein the persistent sensitive data associated with the wallet application comprises payment account information.

7. The method of claim 1, wherein the user device is a mobile device.

8. The method of claim 1, wherein the data in the second entity is associated with a state in the second entity.

9. The method of claim 1, wherein the persistent sensitive data is an account number or expiration date.

10. The method of claim 1, wherein the sensitive data comprises at least one cryptographic key associated with the wallet application.

11. The method of claim 1, wherein the synchronization message is transmitted using Transmission Control Protocol/Internet Protocol (TCP/IP).

12. A user device comprising:
    a processor;
    a computer readable medium coupled to the processor, the computer readable medium comprising code executable by the processor to perform a method comprising:
        automatically detecting a removal of a wallet application at the user device, wherein the removal of the wallet application changes functional code of the user device, and wherein the processor of the user device automatically detects the removal of the wallet application at the user device by identifying a change in state between a persistent storage at the user device and a system memory at the user device;
        initiating a transmission of a synchronization message by the user device to a second entity to apply a coherency protocol for synchronizing end states in the second entity with data in the user device;
        in response to the automatically detecting the removal of the wallet application, receiving an instruction from the second entity to delete persistent sensitive data associated with the wallet application;
        in response to the automatically detecting the removal of the wallet application, deleting the persistent sensitive data associated with the wallet application, wherein the persistent sensitive data being deleted is data that the wallet application uses when the functional code associated with the wallet application is executed,
        wherein the second entity is configured to synchronize the data in the second entity with the data in the user device based upon a predetermined policy with high level of privilege, the predetermined policy specifying a condition to synchronize the second entity and the user device if the second entity and the user device share a common state and the change is due to a reconfiguration of the user device; and
        if there is discrepancy in the end states, the second entity and the user device resolve the discrepancy either by committing to a new state or aborting and rolling back to a previous state so that the end states are coherent.

13. The user device of claim 12, wherein the second entity is a wallet provider.

14. The user device of claim 12, wherein the data in the second entity is associated with a state in the second entity.

15. The user device of claim 12, wherein initiating the transmission of the synchronization message to the second entity comprises transmitting an initiation message to an intermediate entity, wherein the intermediate entity transmits the synchronization message to the second entity.

16. The user device of claim 12, wherein the persistent sensitive data associated with the wallet application comprises payment account information.

17. The user device of claim 12, wherein the user device is a mobile device.

18. A system comprising:
    a user device; and a second entity, wherein the user device and the second entity are communicatively coupled to each other; and wherein the user device comprises:

a processor;

a computer readable medium coupled to the processor, the computer readable medium comprising code executable by the processor to perform a method comprising:

automatically detecting a removal of a wallet application at the user device, wherein the removal of the wallet application changes functional code of the user device, and wherein the processor of the user device automatically detects the removal of the wallet application at the user device by identifying a change in state between a persistent storage at the user device and a system memory at the user device;

initiating, by the user device, a transmission of a synchronization message to the second entity to apply a coherency protocol for synchronizing end states in the second entity with data in the user device;

in response to the automatically detecting the removal of the wallet application, receiving an instruction from the second entity to delete persistent sensitive data associated with the wallet application;

in response to the automatically detecting the removal of the wallet application, deleting the persistent sensitive data associated with the wallet application, wherein the persistent sensitive data being deleted is data that the wallet application uses when the functional code associated with the wallet application is executed, wherein the second entity is configured to synchronize the data in the second entity with the data in the user device based upon a predetermined policy with high level of privilege, the predetermined policy specifying a condition to synchronize the second entity and the user device if the second entity and the user device share a common state and the change is due to a reconfiguration of the user device; and if there is discrepancy in the end states, the second entity and the user device resolve the discrepancy either by committing to a new state or aborting and rolling back to a previous state so that the end states are coherent.

19. The system of claim 18, wherein the user device is a mobile device and the second entity is a wallet provider.

\* \* \* \* \*